Nov. 24, 1925.

W. G. HARVEY 1,563,187

PROCESS OF PRODUCING CALCIUM COPPER ALLOY

Filed Aug. 13, 1921

Inventor
W. G. Harvey
By John Boyle Jr
Attorney

Patented Nov. 24, 1925.

1,563,187

UNITED STATES PATENT OFFICE.

WILLIAM GOOLD HARVEY, OF NIAGARA FALLS, NEW YORK, ASSIGNOR TO AMERICAN MAGNESIUM CORPORATION, OF NIAGARA FALLS, NEW YORK, A CORPORATION OF NEW YORK.

PROCESS OF PRODUCING CALCIUM COPPER ALLOY.

Application filed August 13, 1921. Serial No. 492,176.

*To all whom it may concern:*

Be it known that WILLIAM G. HARVEY, citizen of the United States, residing at Niagara Falls, in the county of Niagara and State of New York, has invented certain new and useful Improvements in Processes of Producing Calcium Copper Alloy, of which the following is a specification.

My invention relates to a method of making an alloy of calcium and copper and one of the objects of the invention is to produce the same electrolytically and in such a manner as to avoid any appreciable loss of calcium by burning.

Figure 1:
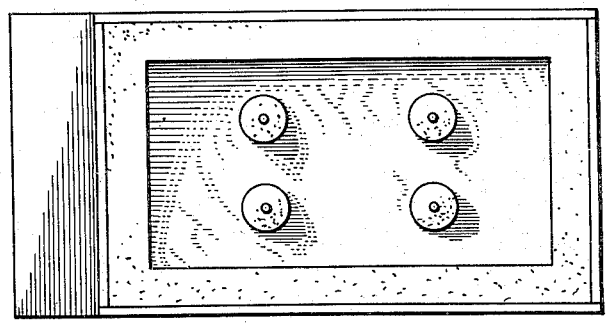
Figure 2:
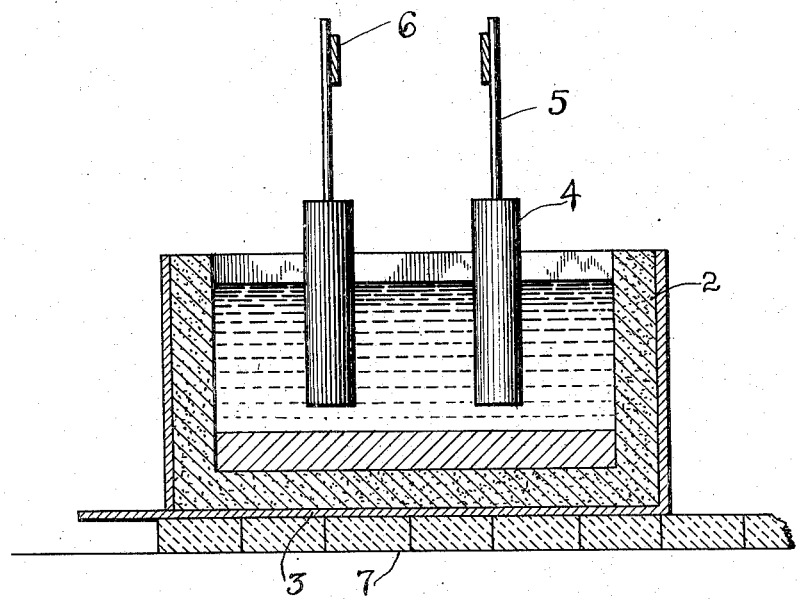

In carrying out my invention, I utilize a furnace as shown in the accompanying drawing in which Fig. 1 is a plan view and Fig. 2 is a vertical section. The furnace comprises a sheet iron receptacle having a carbon lining 2, the bottom 3 forming the negative pole thereof. Carbon anodes 4 are suspended by iron rods 5 from copper bus bars 6. The furnace is supported on a heat insulating brick foundation 7.

In starting a furnace, a suitable quantity of preferably flat pieces of solid copper is placed upon the carbon bottom. Any scrap copper calcium alloy from previous runs may be put in at this time, as an aid to the starting of the furnace, by more quickly lowering the melting point of the cathode. Using electric current, preferably alternating, arcs are struck upon these copper pieces, a favorable voltage for this operation being in the neighborhood of 55. Dried calcium chloride, from which the water of crystallization has been removed by previous fusion, is fed into the furnace around these arcs, and a molten bath very quickly results. The current is then carried through this molten bath and the arcs disappear. This operation of melting is continued until a suitable depth of bath is attained. If alternating current has been used in the preliminary stage, direct current is then substituted. Electrolysis starts at once as is made evident by a very vigorous boiling action around the anodes which is caused by chlorine gas, which is the product at the anode. Metallic calcium deposits on the solid pieces of copper, which act as a cathode.

A considerable quantity of the calcium is taken up by the copper before the cathode alloy becomes completely molten. As the copper continues to absorb calcium, the melting point of the alloy is gradually reduced and eventually the cathode becomes molten. Suitable quantities of dried calcium chloride are added at intervals as the level of the electrolyte is lowered.

Metallic copper is added at intervals and with the purpose of keeping the calcium content in the molten cathode, during most of the period of production, at from 20–30% or an average of approximately 25%. This is an important feature of my invention, as the process will produce the best results when the calcium content of the alloy is as low as possible and still in sufficient amount to keep the alloy molten at all times. After the last addition of copper has been made, the furnace is then run for a period of time, until the alloy has a specific gravity of about 2.8 in the solid state which corresponds to about 50% of calcium. The furnace is then tapped.

The current efficiency decreases as the percentage of calcium in the cathode rises and it would be practically impossible to successfully make an alloy much higher than 50% calcium. When the concentration reaches this point, the specific gravity of the molten alloy is rather close to the specific gravity of the electrolyte and the alloy begins to have a tendency to float. Furthermore, at this concentration, misting of the calcium becomes noticeable and the tendency of the calcium to leave the alloy begins to be equal to the tendency of the calcium to enter the alloy. After this condition is reached, which would be somewhat over 50% of calcium, the alloy on the bottom does not absorb the calcium, but instead, the calcium floats to the top of the bath either as metallic calcium or as high calcium copper alloy and causes much trouble in the operation of the furnace.

The best operating temperature for carrying out the process is approximately from 775–825 degrees C. The melting point of pure calcium chloride is 774 degrees C. and that of the crude salt which is used is probably around 750 degrees C., while that of the 25% calcium alloy is around 800 degrees C. Temperature conditions are an important feature of the process, as the furnace does not work well if the temperature becomes too high.

If it is desired to lower the melting point of the bath, other salts such as barium and sodium chloride may be added to the calcium chloride; for increasing the fluidity calcium fluoride may be added.

I claim:

1. The process of producing calcium copper alloy comprising electrolyzing a molten calcium salt in the presence of a solid copper cathode until sufficient calcium has been taken up by the cathode for it to become molten at the temperature of the molten salt.

2. The process of producing calcium copper alloy, comprising electrolyzing a molten calcium salt in the presence of a cathode containing copper.

3. The process of producing calcium copper alloy comprising electrolyzing molten calcium chloride in the presence of a cathode containing copper.

4. The process of producing a calcium copper alloy by electrolyzing a molten calcium salt in the presence of a molten calcium copper cathode, comprising the step of adjusting the composition of the cathode alloy so that its specific gravity will be greater than that of the calcium salt, and its melting point lower than that of the salt.

5. The process of producing calcium copper alloy comprising electrolyzing molten calcium chloride in the presence of a molten calcium copper cathode containing approximately from 20-30% of calcium.

6. The process of producing calcium copper alloy comprising electrolyzing molten calcium chloride in the presence of a calcium copper cathode and continuing the electrolysis until the alloy contains approximately 50% calcium.

7. The process of producing calcium copper alloy comprising electrolyzing molten calcium chloride in the presence of a molten calcium copper cathode containing approximately from 20-30% of calcium and thereafter continuing the electrolysis until the calcium content is approximately 50%.

8. The process of producing a calcium copper alloy comprising electrolyzing a molten calcium salt in the presence of a molten calcium copper cathode while adjusting the composition of the cathode alloy so as to maintain its specific gravity greater than that of the calcium salt, and thereafter increasing the calcium content until the specific gravity is substantially that of the molten salt.

9. The process of producing calcium copper alloy comprising electrolyzing fused calcium chloride in the presence of a solid copper cathode until sufficient calcium has been taken up by the cathode for it to become molten, at the temperature of the fused calcium chloride, continuing the electrolysis for a period of time and adding copper to maintain approximately 20-30% of calcium in the cathode, and thereafter continuing the electrolysis until the alloy contains approximately 50% of calcium.

10. The process of producing calcium copper alloy comprising electrolyzing molten calcium chloride at a temperature of approximately 775-825 degrees C. in the presence of a cathode containing copper.

11. The process of producing calcium copper alloy by electrolyzing molten calcium chloride in the presence of a calcium copper cathode and during part of the period of production maintaining the calcium content of the cathode as low as possible, but in sufficient amount to keep the same molten and thereafter continuing the electrolysis to increase the content of calcium to the desired amount.

In testimony whereof I affix my signature.

WILLIAM GOOLD HARVEY.